Patented July 13, 1937

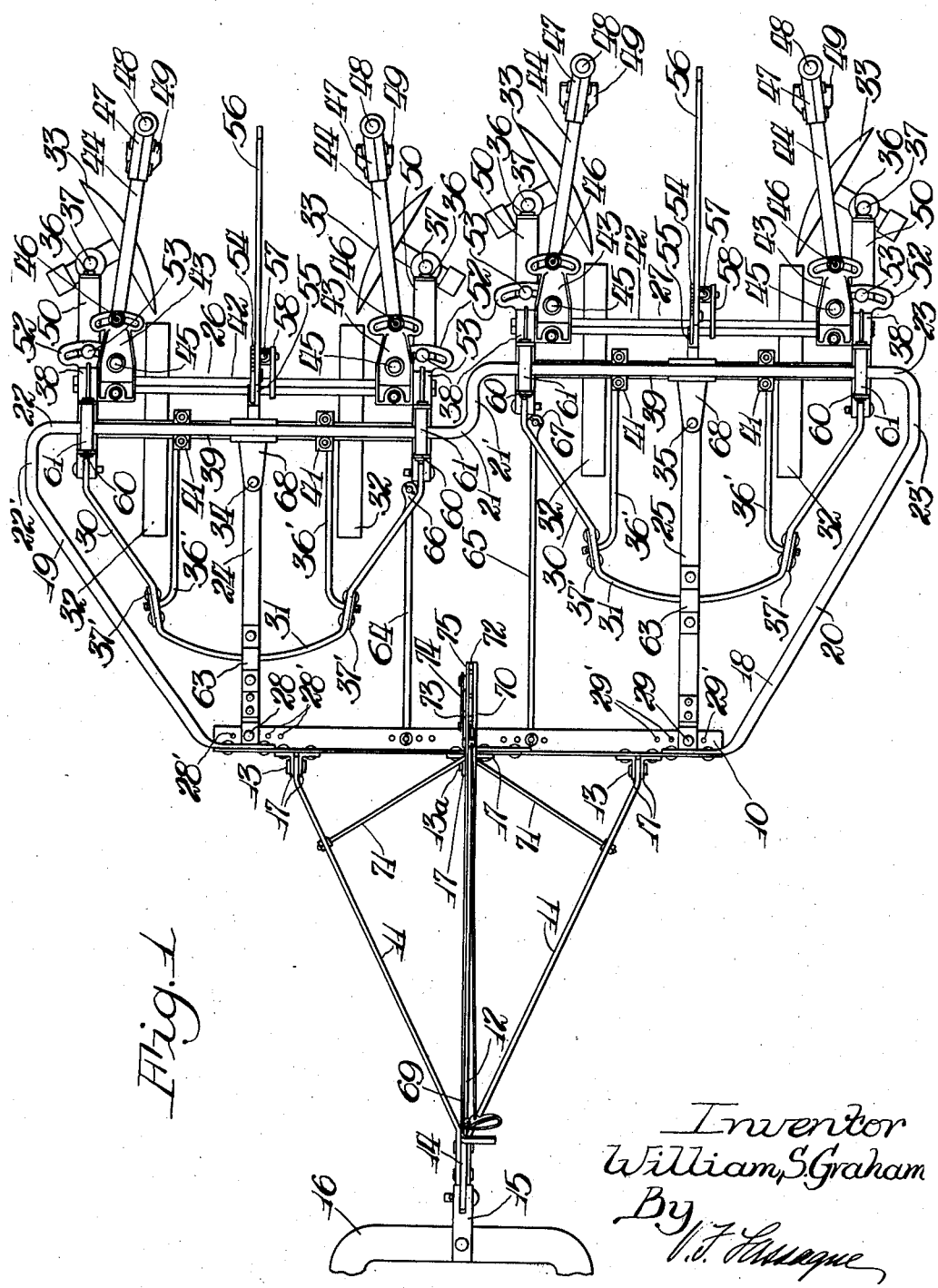

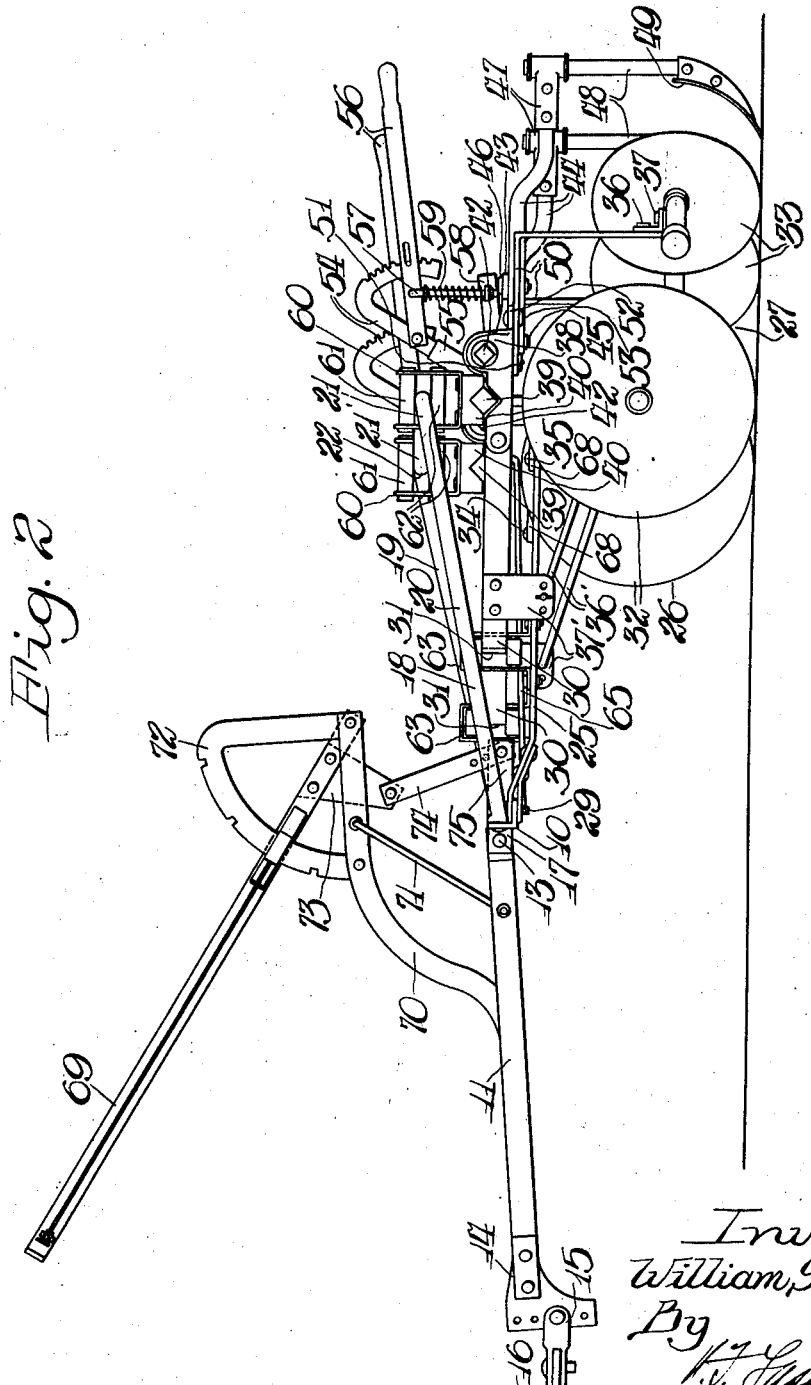

2,086,797

UNITED STATES PATENT OFFICE 2,086,797

TRACTOR LISTER CULTIVATOR

William S. Graham, Canton, Ill., assignor to International Harvester Company, a corporation of New Jersey Application November 29, 1935, Serial No. 52,134

20 Claims. (Cl. 97—143)

This invention relates to lister cultivators of the multiple unit type adapted to be drawn by tractors.

The principal object of the invention is to provide a tractor drawn multiple unit lister cultivator in which the several lister units will be free to follow the furrows or ridges on which they are respectively working and which are so connected to each other and to a common draft frame as to remain in upright position and in parallel relation to each other and to the line of travel of the cultivator as a whole as they shift laterally to follow deviations in the furrows.

Another object of the invention is to so construct the frame of the cultivator that the several units are held in level or stable relationship to each other and to so construct the frame and position the lister cultivator units that clearance is provided so that upon lateral shifting of each unit, the units will not interfere with each other.

Other objects and advantages will appear in the following description of a preferred embodiment of the invention, as illustrated in the accompanying drawings, wherein:

Figure 1 is a plan view of the lister cultivator showing the frame construction and trailing from a tractor draw-bar; and, Figure 2 is a side view of the tractor lister cultivator.

As herein disclosed the cultivator embodying the invention has a draft frame comprising an elongated transverse bar 10 to which forwardly extending, converging, hitch bars 11 and a central hitch bar 12 are pivotally connected on horizontal pivots as at 13. The connected ends of the hitch bar are secured to the usual draft member 14. Adjustably connected to the draft member 14 is a clevis 15 for connecting the lister cultivator to the draw-bar 16 of the tractor. The rear ends of the hitch bars 11 and 12 are pivotally connected at 13a on the horizontal axis of pivots 13 to the draft connecting members 17 which are secured to the transverse member 10. This flexible connection at 13 allows the hitch bars 11 and 12 and the transverse bar 10 of the lister cultivator frame to have relative vertical movement to each other. Secured to the transverse frame member 10 is the frame member 18. The frame member 18 has rearwardly and outwardly diverging members 19 and 20 which also extend upwardly from the frame member 10. A transversely extending portion 21 of the frame 18 is formed integral with the diverging members 19 and 20. The member 21 has two off-set portions 22 and 23. The members 22 and 23 are off-set longitudinally, but lie in the same horizontal plane. The member 18 is preferably in the form of a cylindrical bar.

Pivotally connected to the transverse member 10 are the main draft tongues 24 and 25 of the lister cultivator attachments 26 and 27 respectively. The construction of these lister cultivator units is preferably similar to the cultivator units disclosed in the patent to Olson 1,967,321, granted July 24, 1934. The main draft tongues 24 and 25 are pivotally connected to the transverse frame member 10 at 28 and 29 by the draft pin and clevis portion of the draft tongues. The draft tongues 24 and 25 may be adjusted laterally on the transverse frame member 10 by means of the adjusting holes 28' and 29'. Each lister cultivator unit 26 and 27 is of conventional type comprising a frame 30 formed with a forwardly bowed portion 31 and supported on a pair of furrow guide wheels 32. The usual soil engaging elements such as the disks 33 are located rearwardly of the furrow wheels. Each of these outwardly or laterally disposed cultivator units 26 and 27 are connected to the transverse member 10 by the main draft tongues 24 and 25 pivoted at 34 and 35 to the frames 30 respectively of the units 26 and 27, and these cultivator units are similarly pivoted at 28 and 29 to the transverse member 10. As each of the cultivator units 26 and 27 are similar, like reference characters will denote similar parts. The soil engaging elements 33 have various adjustments as at 36 and 37 for adjusting the angle of cut of the disk. The draw links 36' for the standards of the furrow guide wheels are adjustably connected at their forward ends to brackets 37' secured to the arched portion 31 of the cultivator frames 30. Rear supporting members 38 are secured to the rear ends of the cultivator frames 30. A transversely extending stiffening member 39 is secured to the members 38 by the clamp member 40. The wheels and the standards therefore, are secured to the transverse member 39 by the clamp brackets 41. Adjustably mounted on the rear portions of the bracket members 38 is a transversely extending rockshaft 42. Adjusting brackets 43 are adjustably mounted laterally on the rockshaft 42. The shovel arms 44 are pivotally mounted for horizontal movement at 45 in the adjusting brackets 43 and are adjusted at 46 by means of serrated washers and arcuate bracket 43. Secured to the shovel arms are the shovel arm brackets 47 in which the shanks 48 of the cultivator shovels 49 are adjustably mounted. The rearwardly extending supports 50 are pivoted at 51 to the supporting bracket 38 and are held in adjusted position by the arcuate adjusting member 52 which is a continuation of the supporting bracket 38. The disks 33 and their disk arms complete with the disk bearings are adjustably mounted for vertical movement on the support 50 and are adjustably secured as at 36. The disk arms are adjusted horizontally as at 37. The disk support members 50 are arcuately adjusted in horizontal position by means of the arcuate slot 52 and are held in adjusted position by the serrated clamping means at 53.

In order to adjust the cultivator shovels 49 a quadrant member 54 is secured to a supporting bracket 55 secured to the transverse member 42. A lifting lever 56 is pivoted to the quadrant member 54 and is held in adjusted position by the usual detent and teeth. A lifting link 57 is pivotally connected to the lever 56 and to a crank arm 58 secured to the rockshaft 42. The usual spring pressure may be applied to the shovel arms by the spring 59 on the link 57.

In order to stabilize or hold each cultivator unit 26 and 27 in horizontal alignment supporting brackets 60 are secured to each side of the frame 30, as best shown in Figure 2. The brackets 60 are U-shaped and have upper and lower spaced roller members 61 and 62 journaled thereon. Spaced between the roller members 61 and 62 are the horizontal portions 22 and 23 of the frame or stabilizing member 18, and the portions 22 and 23 may be considered as forming a plurality of means for stabilizing the cultivator units 26 and 27 of the lister cultivator. It is thus seen that the cultivator units 26 and 27 are free to move transversely on the stabilizing or gang engaging portions 22 and 23 of the frame member 18. Each cultivator unit is limited in its horizontal movement by the longitudinal member 21' connecting the transverse portions 22 and 23 in their innermost position and are limited in their outermost position by the longitudinally extending portions 22' and 23' of the frame member 18. The arcuate portions 31 of the cultivator units 26 and 27 are secured to the draft tongues 24 and 25 respectively by the guide loop 63. With this connection the lister units 26 and 27 will follow the vertical movement of the main lister frame formed by the transverse frame member 10 and the frame member 18.

The draft tongue 25 is longer than the draft tongue 24 between the pivot point 29 and the guide loop 63 of the cultivator unit 27 as compared to the distance between the pivot point 28 and the guide loop 63 of the cultivator unit 26. This distance is equivalent to the amount of longitudinal off-set of the portions 22 and 23 of the transverse member 21.

This off-set is used to allow the cultivator units 26 and 27 to have horizontal movement and still not have any of the ground engaging parts on one unit interfering with the ground engaging parts of another unit. In laterally spaced relation to the draft tongues 24 and 25, respectively, each cultivator unit 26 and 27 is provided with an auxiliary draft link 64 and 65 respectively. Each draft link is adjustably mounted at its forward end on the transverse member 10 and at its rear end it is pivotally connected to the frame member 30. It is thus seen that a parallel draft link connection is thus established between each of the cultivator units and the draft members. The pivot point 34 and a pivot point 66 of the cultivator unit 26 and the pivot point 35 and the pivot point 67 form the pivotal connections of the parallel draft link connection formed by the draft tongues 24 and the draft link 64 and the draft tongue 25 and the auxiliary draft link 65 respectively. The draft tongues 24 and 25 are pivotally connected at 34 and 35 respectively by the draft connection 68 which is secured to the transverse frame member 39. Whenever adjustment is necessary for different row widths the parallel auxiliary draft links 64 and 65 must be moved in and out accordingly so as to keep the rods parallel with their respective draft links.

With the connnections thus described it is thus seen that each cultivator unit 26 and 27 may freely move horizontally on the transverse portions 22 and 23 respectively because of the parallel draft connection previously described.

Any longitudinal movement that is necessary because of the shortening of the longitudinal distance because of the swinging of the draft connections 24 and 25 is taken care of by the length of the slot formed between the rollers 61 and 62, the length of the slot being governed by the width of the U-shaped supporting brackets 60. Because of the upper and lower rollers 61 and 62, the cultivator units 26 and 27 are free to swing laterally in either direction as well as to move longitudinally therebetween. The above manner of mounting the cultivator units 26 and 27 permits the units to have limited lateral movement while at the same time maintaining the units in a stable or upright position at all times.

The soil engaging tools of both units may be raised and lowered in unison by the movement of the forwardly extending lifting lever 69 which is pivotally mounted to an upwardly and rearwardly extending member 70 secured to the central hitch bar 12. The supporting member 70 is securely braced by the members 71 connecting the supporting member 70 to the side hitch bars. At the rear end of the supporting member 70 is secured an adjusting quadrant 72 about which the lifting lever 69 is adjusted and latched in adjusted position by the usual detent. A lifting arm 73 is secured to the lifting lever 69. Pivoted link 74 connects the lifting arm 73 to a rearwardly extending bracket member 75 rigidly secured to the transversely extending frame member 10.

It is thus seen that as the front hitch connection of the lister cultivator is secured to the draw-bar 16 that when the lifting lever 69 is pushed downwardly the link 74 is moved downwardly causing the hitch frame and the implement frame to pivot at its axis at 13 causing the implement frame 18 to swing downwardly and pivot about the axes of the furrow guide wheels 32 of the cultivator units 26 and 27, respectively. The axes of the furrow guide wheels 32 of the cultivator units 26 and 27 are not in alignment, the axis of one being advanced about the axis of the other, and whatever movement is necessary relative between the implement frame 18 and the cultivator units 26 and 27 may be provided for in the longitudinal slot between the rollers 61 and 62 of each unit. As the cultivator gangs are raised, the front left hand corner of the implement frame drifts a little faster than the right hand corner of the frame, and as a result is somewhat lower than the other corner when the gangs are raised for transport. The longitudinal slots are also provided to accommodate the lateral swinging action of the gangs as they swing from one side to the other. As the forward portion of the implement frame 18 moves downwardly the rear portions of the frame to which the implement tools are connected are raised simultaneously from the ground. Likewise when the lifting lever 69 is raised the forward portion of the implement frame 18 will be raised allowing the rear portion to move downwardly about the axis of the furrow guide wheels carrying the ground engaging tools therewith into a ground engaging position. As has been previously disclosed the cultivator shovels 49 may be adjusted separately by means of the adjusting lever 56 and the soil engaging disk 42 may be similarly adjusted by means of the adjusting connections 36, 37 and 53. Also, shovel arms 44 may be adjusted laterally by means of the adjusting connection 46. Adjusting holes are also provided in the raising link 74 to help regulate the lift of the gangs. When the links are connected in the lower hole as shown in Figure 2, the amount of the lift is decreased but greater depth is obtained, as the middle or top hole, the height of the lift is increased but less depth can be obtained.

The foregoing structure provides a simple, strong and efficient multiple row lister cultivator in which each unit is capable of independent lateral movement on substantially straight lines without departing from parallel relation to each other and to the direction of travel, the cultivator as a whole being particularly well adapted for free trailing movement and operation behind a tractor.

Modifications in the preferred structure disclosed, of course, may be made without departing from the scope of the invention as defined in the following claims.

What is claimed is:

1. A lister cultivator comprising a plurality of cultivator gangs, a draft frame, an implement frame pivotally connected to the draft frame for relative vertical movement, said cultivator gangs pivotally connected to said implement frame for lateral movement, and means rigidly connected to the implement frame for stabilizing the cultivator gangs.

2. A lister cultivator comprising a plurality of cultivator gangs, a draft frame, an implement frame pivotally connected to the draft frame for relative vertical movement, said implement frame comprising a transversely extending draft member, and means rigidly secured to said transversely extending draft member for stabilizing the cultivator gangs.

3. A lister cultivator comprising a plurality of cultivator gangs, a draft frame, an implement frame pivotally connected to the draft frame for relative vertical movement, said cultivator gangs pivotally connected to said implement frame for lateral movement, means for lifting and lowering said cultivator gangs in unison, and means rigidly connected to the implement frame for stabilizing the cultivator gangs.

4. A lister cultivator comprising a plurality of cultivator gangs, a draft frame, an implement frame pivotally connected to the draft frame for relative vertical movement, said cultivator gangs pivotally connected to said implement frame for lateral movement, the aforesaid cultivator gangs being off-set with respect to each other longitudinally, and means connected to the implement frame and having gang engaging portions off-set with respect to each other longitudinally for stabilizing the cultivator gangs.

5. A lister cultivator comprising a plurality of cultivator gangs, a draft frame, an implement frame pivotally connected to the draft frame for relative movement, said implement frame comprising a transversely extending draft member, and means connected to the implement frame and having gang engaging portions off-set with respect to each other longitudinally for stabilizing the cultivator gangs.

6. A lister cultivator comprising a plurality of cultivator gangs, a draft frame, an implement frame pivotally connected to the draft frame for relative vertical movement, and stabilizing means connected to the implement frame for stabilizing the cultivator gangs, said stabilizing means comprising substantially parallel members extending transversely of the cultivator gangs and rigidly connected to the implement frame.

7. A lister cultivator comprising a plurality of cultivator gangs, a draft frame, an implement frame pivotally connected to the draft frame for relative vertical movement, and stabilizing means rigidly connected to the implement frame for stabilizing the cultivator gangs, said stabilizing means comprising parallel members extending transversely of the cultivator gangs and longitudinally off-set with respect to each other.

8. A lister cultivator comprising a plurality of cultivator gangs, a draft frame, an implement frame pivotally connected to the draft frame for relative vertical movement, said cultivator gangs pivotally connected to said implement frame for lateral movement, and means connected to the implement frame for stabilizing the cultivator gangs, said stabilizing means comprising transversely extending members lying in the same horizontal plane, and rearwardly and upwardly extending members connecting said transversely extending members to the implement frame.

9. A lister cultivator comprising a plurality of cultivator gangs, a draft frame, an implement frame pivotally connected to the draft frame for relative vertical movement, said cultivator gangs pivotally connected to said implement frame for lateral movement, means rigidly connected to the implement frame for stabilizing the cultivator gangs, and means on the stabilizing means for limiting the lateral movement of said cultivator gangs.

10. A lister cultivator comprising a plurality of cultivator gangs, a draft frame, an implement frame, said cultivator gangs pivotally connected to said implement frame for lateral movement, means comprising parallel members longitudinally spaced for stabilizing the cultivator gangs, and means connected to the aforesaid members and laterally spaced thereon for limiting the lateral movement of said cultivator gangs.

11. A lister cultivator comprising a plurality of cultivator gangs, a draft frame, an implement frame, said cultivator gangs pivotally connected to said implement frame for lateral movement, means comprising parallel members longitudinally spaced for stabilizing the cultivator gangs, and longitudinally extending members connected to the aforesaid members and laterally spaced thereon for limiting the lateral movement of said cultivator gangs.

12. A lister cultivator comprising a plurality of cultivator gangs, a draft frame, an implement frame, said cultivator gangs pivotally connected to said implement frame for lateral movement, means comprising parallel members longitudinally spaced for stabilizing the cultivator gangs, a member integral with the stabilizing members and connecting their inner ends, and longitudinally extending members integral with the stabilizing members and connected to their outer ends, whereby the lateral movement of said cultivator gangs will be limited.

13. A lister cultivator comprising a plurality of cultivator gangs, a draft frame, an implement frame pivotally connected to the draft frame for relative vertical movement, parallel draft links pivotally connecting said cultivator gangs to said implement frame, whereby said cultivator gangs may move laterally relative to the implement frame and to each other, means rigidly connected to the implement frame for stabilizing the cultivator gangs, and guide means on said cultivator gangs connected to said stabilizing means whereby said cultivator gangs will be held in horizontal alignment.

14. A lister cultivator comprising a plurality of cultivator gangs, a draft frame, an implement frame pivotally connected to the draft frame for relative movement, said cultivator gangs longitudinally off-set with respect to each other, parallel draft links pivotally connecting said cultivator gangs to said implement frame whereby said cultivator gangs may move relative to each other, means connected to the implement frame for stabilizing the cultivator gangs, and guide means on said cultivator gangs connected to said stabilizing means for allowing longitudinal movement of said cultivator gangs with respect to said stabilizing means.

15. A lister cultivator comprising a plurality of cultivator gangs, a draft frame, an implement frame pivotally connected to the draft frame for relative movement, parallel draft links pivotally connecting said cultivator gangs to said implement frame whereby said cultivator gangs may move relative to each other, means rigidly connected to the implement frame for stabilizing the cultivator gangs, guide means on said cultivator gangs connected to said stabilizing means, and means on said parallel draft links for limiting the vertical movement of said cultivator gangs.

16. A lister cultivator comprising a plurality of cultivator gangs, a draft frame, an implement frame pivotally connected to the draft frame for relative movement, parallel draft links pivotally connecting said cultivator gangs to said implement frame whereby said cultivator gangs may move relative to each other, means rigidly connected to the implement frame for stabilizing the cultivator gangs, guide means on said cultivator gangs connected to said stabilizing means, and means connecting said parallel draft links and said cultivator gangs whereby said cultivator gangs may move relative to said parallel draft links.

17. A lister cultivator comprising a plurality of cultivator gangs, a draft frame, an implement frame pivotally connected to the draft frame for relative movement, said cultivator gangs connected to said implement frame, transporting means for said cultivator gangs, means rigidly connected to the implement frame for stabilizing the cultivator gangs, and means for adjusting the implement frame, whereby the cultivator gangs will be adjusted vertically relative to the transporting means for raising and lowering the cultivator gangs simultaneously.

18. A lister cultivator comprising a plurality of cultivator gangs, a draft frame, an implement frame pivotally connected to the draft frame for relative movement, said cultivator gangs connected to said implement frame and longitudinally off-set with respect to each other, transporting means for said cultivator gangs, means connected to said implement frame for stabilizing the cultivator gangs comprising transverse members interconnected and longitudinally off-set with respect to each other, and means for adjusting the implement frame, whereby the cultivator gangs will be adjusted vertically relative to the transporting means for raising and lowering the cultivator gangs simultaneously.

19. A lister cultivator comprising a plurality of cultivator gangs, a draft frame, an implement frame pivotally connected to the draft frame for relative movement, said cultivator gangs connected to said implement frame and longitudinally off-set with respect to each other, transporting means for said cultivator gangs, means connected to said implement frame for stabilizing the cultivator gangs comprising transverse members interconnected and longitudinally off-set with respect to each other, means for adjusting the implement frame, whereby the cultivator gangs will be adjusted vertically relative to the transporting means for raising and lowering the cultivator gangs simultaneously, and guide means connecting said cultivator gangs to the transverse stabilizing members whereby the cultivator gangs will be held in horizontal alignment.

20. A lister cultivator comprising a plurality of cultivator gangs, a draft frame, an implement frame pivotally connected to the draft frame for relative movement, said cultivator gangs connected to said implement frame and longitudinally off-set with respect to each other, transporting means for said cultivator gangs, means connected to said implement frame for stabilizing the cultivator gangs comprising transverse members longitudinally off-set with respect to each other, means for adjusting the implement frame whereby the cultivator gangs will be adjusted vertically relative to the transporting means for raising and lowering the cultivator gangs simultaneously, and means connecting the cultivator gangs to the stabilizing members, whereby the cultivator gangs will move longitudinally relative to the stabilizing members.

WILLIAM S. GRAHAM.